United States Patent Office 3,420,654
Patented Jan. 7, 1969

3,420,654
METHOD OF CONTROLLING GROWTH OF ALGAE WITH BENZOFURAZANS AND BENZOFURAZAN-1-OXIDES
William N. Cannon, Greenwood, and Koer Gerzon, Indianapolis, Ind., assignors to Eli Lilly and Company, Indianapolis, Ind., a corporation of Indiana
No Drawing. Filed Oct. 23, 1965, Ser. No. 504,077
U.S. Cl. 71—67                                    8 Claims
Int. Cl. A01n 23/00

ABSTRACT OF THE DISCLOSURE

Method of controlling algae with benzofurazans or benzofurazan-1-oxides optionally substituted by alkyl, alkoxy, halogen or nitro.

This invention relates to a novel method of controlling the growth of algae. More particularly, the invention relates to a method of controlling the undesirable growth of algae in water cooling towers, ponds, shallow pools, and the like.

Algae are chlorophyll-containing aquatic plants which range in size from the single cell types, such as the green algae, to the large and complex varieties, such as the kelps, which may attain a length of thirty yards or more. They are encountered in greater or lesser degree in every water supply that is exposed to sunlight. Many are readily recognized by the layman as the greenish scum frequently seen on ponds, pools, water cooling towers, and the like. The presence of chlorophyll makes it possible for the algae to provide their own nutritive requirements by photosynthesis from atmospheric carbon dioxide and minimal quantities of inorganic materials present in the water. This ability to carry on photosynthesis is absent in all typical bacteria, actinomycetes, fungi, yeasts, and protozoa. The rapid proliferation of algae has in recent years attracted considerable interest directed toward the controlled cultivation of algae as a source of human and animal food. It is not this aspect of algae growth which is of interest in connection with the present invention, but rather the serious problems raised by the growth of algae in places such as water-cooling towers, swimming pools, fresh water ponds and lakes, and the like. In water supply systems their presence may impart a markedly unpleasant taste to the drinking water. In shallow ponds and lakes their overabundance may deplete the fish population inasmuch as they frequently accumulate to form aggregates called "blooms" which may seriously hamper recreation and further deplete the available oxygen by decay or respiration within the blooms. Additionally, some algae are known to release materials which are extremely toxic to fish. In cooling towers they cause significant economic losses by obstructing the free flow of water throughout the towers, decreasing tower efficiency and necessitating the expenditure of countless man-hours of work in cleaning operations.

Cooling towers are commonly used in connection with cooling-water systems employing heat exchangers, as for example air conditioning systems and systems for cooling chemical reactors. Various designs of cooling towers are in common use, including those having a forced draft or an induced draft for enhancing contact of air and heated water; those of the falling-film type and others similarly utilizing natural draft; and those which disperse the water by means of a spray mechanism. Since all these types of cooling towers, and hence the cooling-water systems of which they are an integral part, are open to the atmosphere, the water which passes through them is readily contaminated by any stray air-borne microorganism which can exist on the minimal nutritional sources present in the cooling water. Contamination by algae is a particularly serious problem in both the forced-draft and induced-draft types of cooling tower because of the enormous volumes of air used to cool the heated water by evaporation. Most of the contamination in such towers has been attributed to algae, although other microorganisms such as fungi, protozoa, and bacteria also make a contribution to the contamination problem.

In order to illustrate the effect of algae upon cooling-tower operation, a consideration of the mode of operation of a tower of the forced-draft or induced-draft type is useful. In such a cooling tower the heated water is pumped from the heat exchangers and is dispersed upon a plate in which there are small holes. On passing through the holes, the water forms droplets which fall on a fill composed of a 3-dimensional network of either wooden boards or battens, or a plastic grid. The purpose of the fill is to break up the droplets of water into particles which are as fine as possible so that the air, which is forced or drawn through the fill, will evaporate the maximum amount of water during its passage and will thus provide maximum cooling of the water. The fill is usually contained between two sets of baffles, the first of which is used to direct the incoming air, and the second to minimize loss of water as mist. Ultimately, the cooled water emerging from the bottom of the fill, before being pumped to the heat exchanger, is screened or filtered so that dirt, algae, and the like do not deposit in pipes and on the surface of the heat exchanger, thereby lessening the efficiency of the cooling system.

As can be seen from the above generalized description, there are many areas within the cooling tower in which algae can interfere with efficient operation. In the first place, the algae can clog the holes in the plate through which the heated water from the heat exchanger is dropped onto the fill; secondly, they can occlude the surfaces of the fill and render the fill less efficient for breaking up the water droplets into fine particles; thirdly, the algae can coat the baffles, thus decreasing their efficient operation by increasing the pressure drop across the baffles, thereby decreasing the efficiency of the draft-inducing fans; and finally, the presence in the water of algae necessitates the frequent cleaning of screens or filters used to remove waste materials from the cooling water.

It is an object of this invention to provide a method for controlling the growth of algae in cooling-water systems, swimming pools, ponds and the like by addition of a noncorrosive and nontoxic material which is capable even at very low concentration of preventing the proliferation of a wide variety of algae.

In accordance with the invention there is provided a method of controlling the growth of algae comprising the addition to waters subject to contamination by these plants of a quantity of a substituted benzofurazan, a benzofurazan-1-oxide, or a derivative thereof, sufficient to maintain a concentration in the water of at least about 0.1 p.p.m. of the organic compound.

The benzofurazan-1-oxides and substituted benzofurazans of this invention may be represented by the Formulas I and II

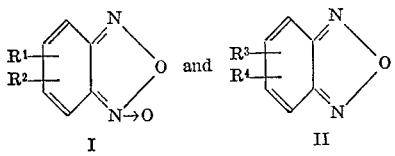

wherein $R^1$, $R^2$, and $R^3$ may be either alike or different and are hydrogen, lower alkyl containing from one to five carbon atoms, lower alkoxyl, halo, nitro, and the like, and $R^4$ is lower alkyl containing from one to five carbon atoms, lower alkoxyl, halo, nitro, and the like. The compounds of the present invention can be prepared by methods well known to those skilled in the art. One such method for the preparation of benzofurazan-1-oxides is described in J. Chem. Soc. 1913, pp. 897–901. Procedures for the preparation of substituted benzofurazans are described in J. Am. Chem. Soc., 76 (1954), p. 2236.

In the practice of this invention, a substituted benzofurazan or benzofurazan-1-oxide is added to the water in a quantity sufficient to provide a concentration of the compound therein of at least about 0.1 p.p.m. The upper limit of concentration of the compounds of this invention is not critical and may be as high as 200 p.p.m. or more, depending upon the severity of contamination. Ordinarily a lower concentration, suitably between about 1 p.p.m. and about 100 p.p.m., is preferred. The algaecidal compound may be added either alone or, preferably, in conjunction with one or more adjuvants as for example water, organic solvents, surface-active dispersing agents, emulsifying agents, and the like. A preferred composition comprises the active ingredient in the form of an emulsifiable liquid concentrate which is added in proper amount to the water being treated. In the case of cooling tower water, this is accomplished conveniently by adding for each 10,000 gallons of cooling water one gallon of an emulsifiable concentrate containing 10 percent by weight of the compound, thus providing an initial concentration of the material of about 10 p.p.m. Additional quantities of the algaecide are added periodically as desired in order to maintain the proper concentration, since during each complete cycle there is lost as mist about one percent of the cooling water and of any materials which may be dissolved therein. These subsequent additions are conveniently made by simply adding the proper amount of the compound to the make-up water which is added to restore the volume of the cooling water.

The operation of many cooling towers includes a step known in the trade as "blowdown," which involves the continuous withdrawal from the tower of a given amount of water and its replacement with fresh make-up water. In some cases the volume of water so replaced during a day's operation can equal the total volume. In this type of operation it is desirable to add the active ingredient in an amount sufficient to maintain an effective concentration despite the subsequent dilution, suitably about 200 p.p.m. or more as an initial concentration. Alternatively, an effective concentration can be maintained by continuously metering the compound in with the make-up water or by frequent periodic additions of the material to the make-up water.

For the control of algae in pounds, pools, lakes, and the like, a preferred concentration of about 5 p.p.m. is achieved by the addition of the desired compound at the rate of about 0.25 lb. per acre-foot. This can be done either by the addition of a concentrate containing the required quantity of the material at a given point beneath the surface of the water, or by spraying the surface with a similar concentrate. Alternatively, the composition may be distributed rapidly throughout large bodies of water by introducing it into the vortex of the propeller of a boat traversing the surface. The latter two procedures provide the advantage of more rapid elimination of the algae already present in the water.

Typical of the algae which can occur in the waters of cooling towers, ponds, lakes, and pools are *Chlorella vulgaris, Scenedesmus basiliensis, Scenedesmus dimorphus, Scenedesmus naegeli, Bracteococcus cinnabarinus, Stichococcus bacillanis, Chlorocloster engadiensis,* and species of *Trebouxia*. All of these algae are inhibited by concentrations of between about 0.1 p.p.m. and about 10 p.p.m. of the compounds of this invention.

Among the compounds which are preferred in the practice of the invention are 4-nitrobenzofurazan,
4-nitrobenzofurazan-1-oxide,
benzofurazan-1-oxide,
6-chlorobenzofurazan-1-oxide,
6-bromobenzofurazan-1-oxide,
5-bromobenzofurazan-1-oxide,
5,6-dichlorobenzofurazan-1-oxide,
6-carboxybenzofurazan-1-oxide,
6-methylbenzofurazan-1-oxide,
5,6-dimethylbenzofurazan-1-oxide,
5-methoxybenzofurazan-1-oxide,
5-ethoxybenzofurazan-1-oxide,
6-isopropylbenzofurazan-1-oxide,
6-ethylbenzofurazan-1-oxide,
6-butylbenzofurazan-1-oxide, and
6-amylbenzofurazan-1-oxide.

It is to be understood that the foregoing list is illustrative only and is not to be construed as limiting the scope of the invention.

The following operating example is provided by way of illustration only and is not to be construed as limiting the scope of the invention.

EXAMPLE

A cooling tower of the induced draft type, having a capacity of 100,000 gallons with a through rate of 6,000 gallons per minute, was found to be contaminated with algae. Ten gallons of the emulsifiable concentrate containing 10 percent by weight of benzofurazan-1-oxide were added to the tower water, providing an initial concentration of 10 p.p.m. of the active ingredient. Water samples were withdrawn frequently and were analyzed for benzofurazan-1-oxide content, further additions of the emulsifiable concentrate being made as needed to maintain the desired level of the compound. After ten days of tower operation, the growth of algae was effectively inhibited as evidenced by the absence of algae upon both visual and microscopic examination of the water.

We claim:

1. The process of controlling the growth of algae in water which comprises adding to the water an effective amount of a compound selected from the class consisting of the benzofurazan-1-oxides and benzofurazans represented by the Formulas I and II

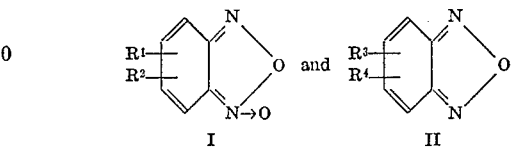

wherein $R^1$, $R^2$, $R^3$, and $R^4$ are groups which are substituted on the quinonoid nucleus, $R^1$, $R^2$, and $R^3$ being members of the group consisting of hydrogen, lower alkyl containing from one to five carbons, methoxy, ethoxy, chloro, bromo and nitro, and $R^4$ being a member of the group consisting of lower alkyl containing from one to five carbons, methoxy, ethoxy, chloro, bromo and nitro.

2. The process of claim 1 wherein the compound is added in a quantity sufficient to provide the active ingredient in a final concentration of at least about 1 p.p.m.

3. The process of claim 1 wherein the compound is added in a quantity sufficient to provide the active ingredient in a final concentration of between about 1 p.p.m. and about 100 p.p.m.

4. The process of claim 1 wherein the selected compound is benzofurazan-1-oxide.

5. The process of claim 1 wherein the selected compound is 4-nitrobenzofurazan-1-oxide.

6. The process of claim 1 wherein the selected compound is 5,6-dichlorobenzofurazan-1-oxide.

7. The process of claim 1 wherein the selected compound is 6-methoxybenzofurazan-1-oxide.

8. The process of claim 1 wherein the selected compound is 4-nitrobenzofurazan.

References Cited

UNITED STATES PATENTS 2,630,438  3/1953  Rosenwald _____ 260—398.5
3,260,621  7/1966  Shaw et al. _____ 260—307.4

OTHER REFERENCES

Lappi et al.: Chemical Abstracts, 1951, vol. 45, p. 9804.

ALBERT T. MEYERS, *Primary Examiner.*

D. R. MAHANAND, *Assistant Examiner.*

U.S. Cl. X.R.

71—66; 106—15; 210—64